United States Patent [19]

Iwashita

[11] Patent Number: 5,091,684
[45] Date of Patent: Feb. 25, 1992

[54] SERVO-CONTROL APPARATUS

[75] Inventor: Yasusuke Iwashita, Yamanashi, Japan

[73] Assignee: Fanuc Ltd., Minamitsuru, Japan

[21] Appl. No.: 476,490

[22] PCT Filed: Oct. 6, 1989

[86] PCT No.: PCT/JP89/01031
§ 371 Date: Jun. 7, 1990
§ 102(e) Date: Jun. 7, 1990

[87] PCT Pub. No.: WO90/04882
PCT Pub. Date: May 3, 1990

[30] Foreign Application Priority Data

Oct. 17, 1988 [JP] Japan .................................. 63-261144

[51] Int. Cl.$^5$ ............................................. G05B 13/00
[52] U.S. Cl. ................................... 318/616; 318/615; 318/618
[58] Field of Search .......................... 318/560,561 605,610,615,618,625

[56] References Cited

U.S. PATENT DOCUMENTS

| 4,587,469 | 5/1986 | Ibeke et al. | 318/561 |
|---|---|---|---|
| 4,626,754 | 12/1986 | Habermann et al. | 318/605 |
| 4,958,114 | 9/1990 | Ogawa | 318/561 |

OTHER PUBLICATIONS

Smith, R. J., *Circuits, Devices, And Systems*, 3rd Ed., pp. 240-244.
Fink et al., *Electronics Engineers' Handbook*, 2nd Ed., McGraw-Hill, 1982, 17-47 & 17-52.
*McGraw-Hill Dictionary of Scientific and Technical Terms*, 2nd Ed., 1978, p. 892, 1651.
*IEEE Standard Dictionary of Electrical and Electronics Terms*, 3rd Ed., 1984, pp. 478, 957.

Primary Examiner—Paul Ip
Attorney, Agent, or Firm—Staas & Halsey

[57] ABSTRACT

A servo-control apparatus is for generating a torque command conforming to a difference between a commanded velocity and actual velocity and controlling the velocity of a servomotor based on the torque command. The apparatus is provided with an observer (50) for reducing to zero an error between the actual velocity of the motor and estimated velocity and an error between the disturbance torque and an estimated disturbance torque. The estimated disturbance torque is inputted to a high-pass filter (70) to generate a corrective torque command, the torque command is corrected by a torque command correcting unit (15), and the torque command obtained by the correction is inputted to a servomotor (18) to control the velocity thereof.

2 Claims, 4 Drawing Sheets

SERVO-CONTROL APPARATUS

BACKGROUND OF THE INVENTION

1. Field of the Invention

This invention relates to a servo-control apparatus for controlling the velocity of a servomotor. More particularly, the invention relates to a servocontrol apparatus capable of eliminating the influence of a disturbance torque.

2. Description of the Related Art

In velocity control of an AC motor such as an induction motor or synchronous motor, a current command (torque command) conforming to the error between a commanded velocity and actual velocity is generated to make the actual velocity coincide with the commanded velocity. FIG. 7 is a block diagram of a conventional velocity loop, in which numeral 1 denotes an arithmetic unit for calculating a velocity error, which is the difference between a commanded velocity $V_{CMD}$ and actual velocity $V_{FB}$, 2 an integrator having an integration gain $k_1$ for integrating the output of the arithmetic unit 1, 3 a proportional unit set to a proportional gain $k_2$ for outputting $k_2 \cdot V_{FB}$, 4 an arithmetic unit for calculating the difference between the outputs of the integrator and proportional unit, 5 a setting unit for setting a torque constant $K_t$, 6 an arithmetic unit for adding a disturbance torque and the output of the torque-constant setting unit, and 7 a motor. $J_m$ represents motor inertia.

In the velocity loop of FIG. 7, the influence of the disturbance torque appears as a fluctuation in motor velocity and is reflected in the torque command through the integrator 2, having a transfer function of is $k_1/s$, and the proportion unit 3, whose proportional gain is $k_2$. Consequently, even through a fluctuation in velocity is produced by the disturbance, the overall velocity loop acts in a direction to reduce the fluctuation in velocity. The higher the gain of the velocity loop, the greater the degree to which the disturbance is suppressed. However, there is a limit to the gain, for the overall system will fall into an oscillatory state if the velocity loop gain is made too high. In other words, if the disturbance torque is large, the fluctuation in motor velocity cannot be suppressed sufficiently because the degree of suppression cannot be raised. For example, when cutting is performed by a machine tool, problems occur, such as an uneven cut surface.

Accordingly, an object of the present invention is to provide a servo-control apparatus in which the system will not oscillate and which is capable of applying a sufficient torque correction with regard to the disturbance torque, thus making it possible to sufficiently suppress a fluctuation in motor velocity due to a disturbance torque.

SUMMARY OF THE INVENTION

In accordance with the present invention, the foregoing object is attained by providing a servo-control apparatus, which is for generating a torque command conforming to a difference between a commanded velocity and actual velocity and controlling velocity of a servomotor based on the torque command, with an observer for estimating actual velocity and disturbance torque, and for reducing to zero an error between the actual velocity and estimated velocity and an error between the disturbance torque and an estimated value of the disturbance torque, a high-pass filter for applying high-pass processing to the disturbance torque estimated by the observer, and a torque-command correcting unit for correcting, based on the result of high-pass processing, the torque command applied to the servomotor.

DESCRIPTION OF THE PREFERRED EMBODIMENT

The present invention provides an observer for estimating actual velocity of a motor and disturbance torque, and for reducing to zero an error between the actual velocity of the motor and estimated velocity and an error between the disturbance torque and an estimated value of the disturbance torque, and corrects a torque command, which is applied to a servomotor, based on the disturbance torque estimated by the status estimating unit. The principle of the status estimating unit will be described first.

In order to perform control based on status feedback, it is required that all status quantities of a controlled system be measurable at every point in time. However, in an ordinary multiple-variable system, all status quantities cannot be measured directly if the number of variables is too large. Therefore, status variables which cannot be measured must be estimated from outputs directly measurable within the control system. One method of estimating status quantities is to construct a model of the control system and estimate status quantities by comparing the output of the control system and the output of the model system. Such estimating means is referred to as an "observer". Consider an n-dimensional linear system SYS (see FIG. 2) that satisfies the following equations:

$$\dot{X} = Ax + Bu, \ x(t) = x_o \qquad (1)$$

$$y = Cx \qquad (1)$$

In this system SYS, u(t) represents a control input (manipulated variable), x(t) represents the status, and y(t) represents an output.

If a system identical with the above-described system (process) SYS is constructed as a model MDL and the same input is applied thereto, the model will be expressed as follows:

$$\dot{\hat{X}} = A\hat{x} + Bu, \ \hat{x}(0) = 0 \qquad (2)$$

Whether x can be estimated from the status $\hat{x}$ will now be considered. If the difference between the status $x(t)$ of the system SYS and the status $\hat{x}(t)$ of the model MDL is assumed to be $$\hat{x}(t) - x(t) = e(t) \qquad (3)$$

then we will have the following from Eqs. (1) and (2):

$$\dot{e}(t) = \dot{x}(t) - \dot{\hat{x}}(t) \quad (4)$$
$$= A\{x(t) - \hat{x}(t)\} = Ae(t)$$

where $e(0) = x_o$.

Figure 2:
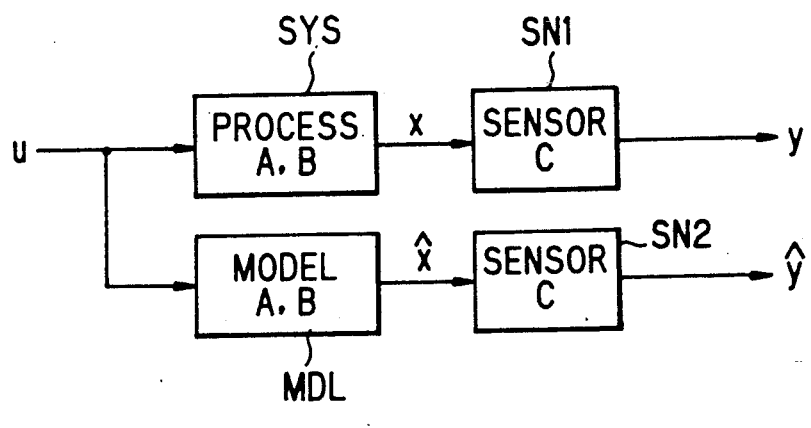
FIGS. 2 and 3 are views for describing the principle of an observer.

If Eq. (4) is asymptotically stable, namely if the real parts of the eigenvalue of A are all negative, then $e(t) \to 0$ for $t \to$ infinity. Therefore, $\hat{x}(t)$ will approach $x(t)$ asymptotically. Otherwise $\hat{x}(t)$ will not indicate information relating to $(x)t$ and the status of the system SYS indicated by Eq. (1) cannot be estimated from Eq. (2). In FIG. 2, SN1, SN2 denote sensors.

Figure 3:
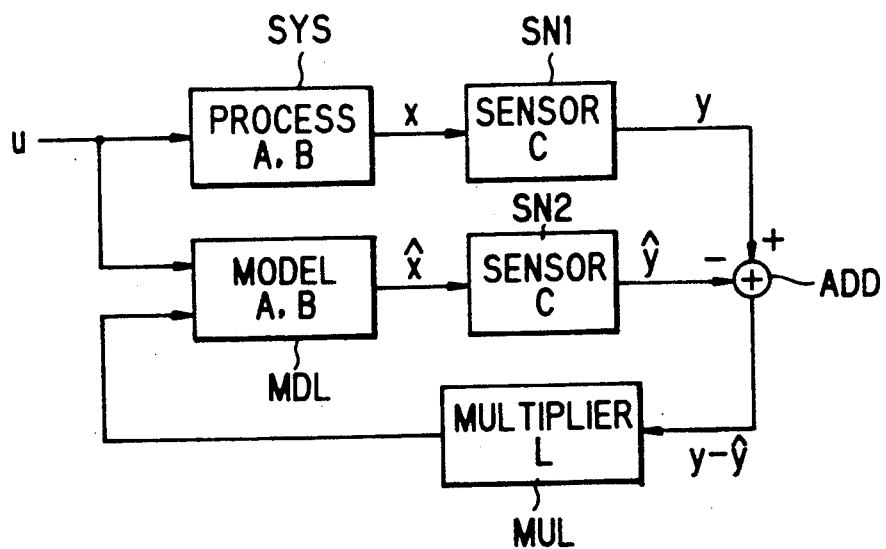

Consider utilizing feedback in order to arrange it so that $(e) \to 0$ will be achieved asymptotically without fail. More specifically, as shown in FIG. 3, the difference between the output of the original system SYS and the output of the estimating system MDL is utilized as feedback and an arrangement is adopted as set forth below. In FIG. 3, ADD represents an adder, and MUL represents a multiplier.

$$\dot{\hat{X}} = A\hat{X} + Bu + L(y - C\hat{x}), \quad \hat{x}(0) = 0 \quad (5)$$

Subtracting Eq. (5) from Eq. (1) gives $$\dot{e}(t) = Ae(t) - LCe(t) \quad (6)$$
$$= (A - LC)e(t), \quad e(0) = x_o$$

Therefore, $$e(t) = \{exp(A - LC)t\} \cdot e(0)$$

This $e(t)$ is equal to $x(t) - \hat{x}(t)$. Accordingly, if an L exists which makes the root of the characteristic equation negative, then $e(t) \to 0$ will hold without fail at $t \to$ infinity and the observer of the system of Eq. (1) is realizable with the system of Eq. (5). In the foregoing, A, B, C, L are predetermined matrices.

Figure 4:
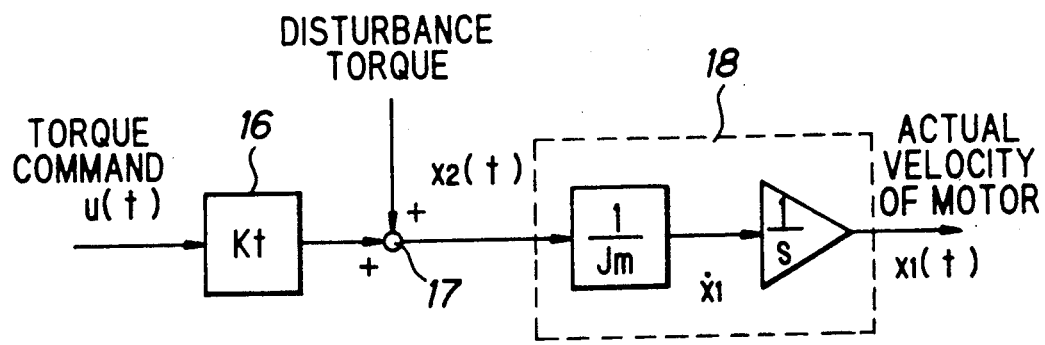
FIG. 4 is a view showing the conditions in a velocity loop from a torque command to actual velocity of a motor.

In the present invention, an observer is constructed for the velocity loop in order to estimate disturbance torque. FIG. 4 represents the conditions in velocity control of a servomotor from a torque command to actual velocity of a motor. In FIG. 4, $u(t)$ represents the torque command, $x_2(t)$ the disturbance torque, and $x_1(t)$ the actual velocity of the motor. Numeral 16 denotes a torque-constant setting unit, 17 an arithmetic unit, and 18 a servomotor. $J_m$ represents the inertia of the motor. The following holds with regard to status variables $x_1, x_2$:

$$\begin{bmatrix} \dot{x}_1 \\ \dot{x}_2 \end{bmatrix} = \begin{bmatrix} 0 & 1/J_m \\ 0 & 0 \end{bmatrix} \begin{bmatrix} x_1 \\ x_2 \end{bmatrix} + \begin{bmatrix} K_t/J_m \\ 0 \end{bmatrix} u \quad (7)$$

If this system is treated as a discrete value system and the sampling time is taken as being T, then Eq. (7) can be expressed as the following recurrence formula:

$$\begin{bmatrix} x_1(i+1) \\ x_2(i+1) \end{bmatrix} = \begin{bmatrix} 1 & T/J_m \\ 0 & 1 \end{bmatrix} \begin{bmatrix} x_1(i) \\ x_2(i) \end{bmatrix} + \begin{bmatrix} K_t \cdot T/J_m \\ 0 \end{bmatrix} u(i) \quad (8)$$

Eq. (8) is rewritten as follows:

$$x(i+1)^T = A_d x(i)^T + B_d u(i) \quad (8)'$$

and an observer with regard to this is constructed as expressed by Eqs. (9) and (10) below.

$$Z(i+1)^T = A_d \hat{x}(i)^T + B_d u(i) \quad (9)$$

$$\hat{x}(i)^T = z(i)^T + K^T(y(i) - Cz(i)^T) \quad (10)$$

where $\hat{x}(i)^T =$ $$\begin{bmatrix} \hat{x}_1(i) \\ \hat{x}_2(i) \end{bmatrix}$$

and $\hat{x}_1, \hat{x}_2$ are estimated values of $x_1, x_2$. Further, $$z(i)^T = \begin{bmatrix} z_1(i) \\ z_2(i) \end{bmatrix}, \quad y(i) = Cx(i)^T$$

and C, which is an output vector, is [1,0]. Accordingly, we have $$y(i) = [1, 0] \begin{bmatrix} x_1(i) \\ x_2(i) \end{bmatrix} = x_1(i)$$

and Eq. (10) becomes $$\hat{x}(i)^T = z(i)^T + K^T C(x_1(i) - z_1(i)) \quad (10)'$$

where $K^T$, which is a gain vector, is as follows:

$$K^T = \begin{bmatrix} K_{10} \\ K_{20} \end{bmatrix}$$

The error vector $e(i)^T = \hat{x}(i)^T - x(i)^T$ at this time becomes as follows using Eqs. (8)', (9) and (10)':

$$e(i)^T = (A_d - K^T CA_d)e(i-1)^T \quad (11)$$

Therefore, if the eigenvalues of the matrix $(A_d - K^T CA_d)$ are in a unit circle, then $e(i)T \to 0$ will hold and the estimated value $\hat{x}(i)^T$ will converge to the actual value $x(i)^T$.

Rewriting the foregoing observer, we have $$z_1(i+1) = \hat{x}_1(i) + (T/J_M) \cdot \hat{x}_2(i) + (K_t T/J_m)u(i)$$

$$z_2(i+1) = \hat{x}_2(i)$$

$$\hat{x}_1(i) = z_1(i) + K_{10}(x_1(i) - z_1(i))$$

$$\hat{x}_2(i) = z_2(i) + K_{20}(x_1(i) - z_1(i)) \quad (12)$$

Figure 5:
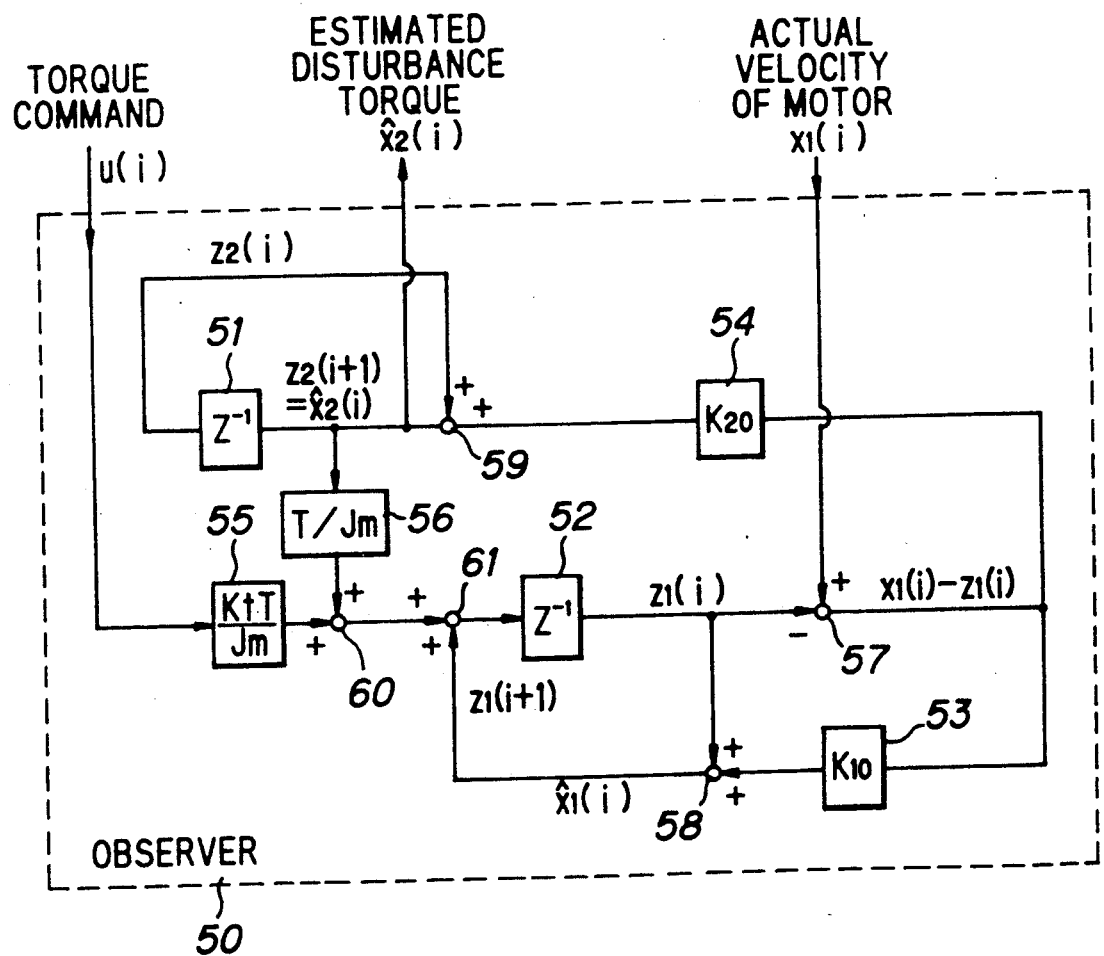
FIG. 5 is a block diagram of an observer for estimating disturbance in accordance with the present invention.

If this is expressed using a block diagram, the observer will be as shown in FIG. 5. In FIG. 5, blocks 51, 52 indicated by $Z^{-1}$ are delay units for a delay of one sampling time, numerals 53–56 denote gain setting units for setting gains $K_1$, $K_2$, $K_t T/Jm$, $T/J_m$, respectively, and numerals 57–61 represent arithmetic units. Further, $x_1(i)$ denotes actual velocity of the motor, $\hat{x}_2(i)$ estimated disturbance torque, and $u(i)$ a torque command.

Figure 1:
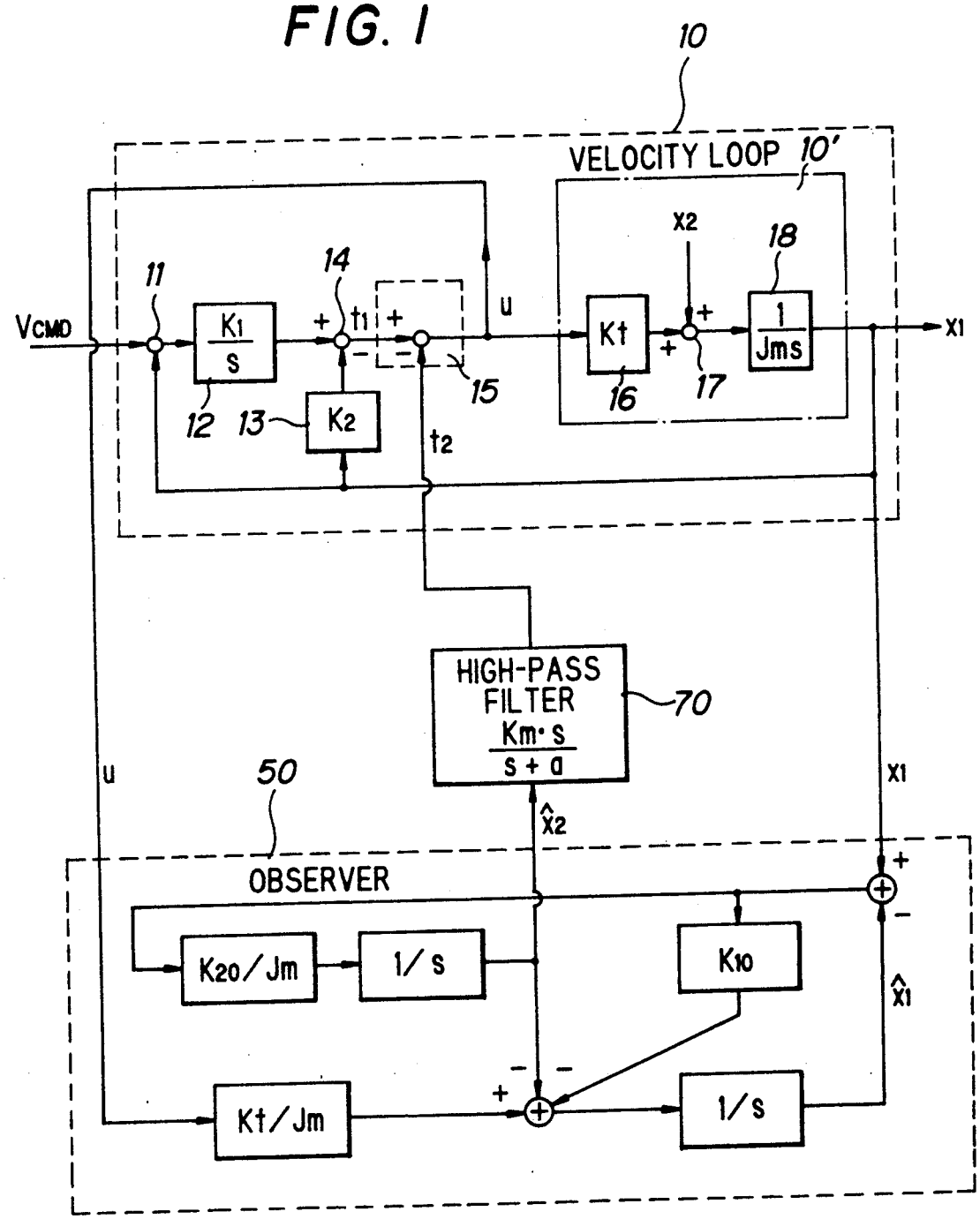
FIG. 1 is a block diagram of a servo-control system according to the present invention.

FIG. 1 is a block diagram of a velocity control system incorporating this observer and illustrates the observer in simplified form.

Numeral 10 denotes a velocity loop which, with the exception of an analog section (an amplifier, motor and current loop) 10' enclosed by the one-dot chain line, is implemented in its entirety by digital processing using software. Numeral 50 denotes an observer similarly implemented by digital processing using software. Numeral 70 designates a high-pass filter, to which a disturbance torque $\hat{x}_2$ estimated by the observer 50 is inputted, for generating a corrective torque command $t_2$.

In the velocity loop 10, numeral 11 denotes an arithmetic unit for calculating the velocity error, which is the difference between commanded velocity VCMD and motor velocity $x_1$, 12 an integrator ($K_1/x$) having an integration gain $K_1$ for integrating the output of the arithmetic unit 11, 13 a proportion unit for outputting $K_2 \cdot x_1$, 14 an arithmetic unit for generating a torque command (a torque command computed by the velocity loop) $t_1$ by calculating the difference between the outputs of the integrator and proportion unit, and 15 a torque command correcting unit (arithmetic unit) for correcting the torque command, which is outputted by the arithmetic unit 14, by the corrective torque command $t_2$ outputted by the high-pass filter 70, thereby producing a true torque command u. Numeral 16 denotes a setting unit for setting a torque constant $K_t$, 17 a unit for entering the disturbance torque $x_2$, and 18 a motor. The motor inertia is $J_m$.

The observer 50 for estimating the disturbance torque $x_2$ is designed in such a manner that the error between the actual velocity $x_1$ of the motor and the esimated velocity $\hat{x}_1$ thereof, as well as the error between the disturbance torque $x_2$ and the estimated value $\hat{x}_2$ of the disturbance torque, will converge to zero.

Figure 6:
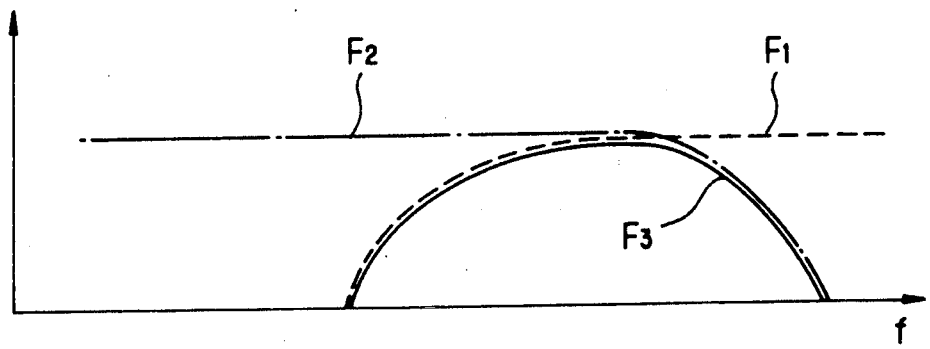
FIG. 6 is a view for describing the observer and the frequency band of a high-pass filter.
Figure 7:
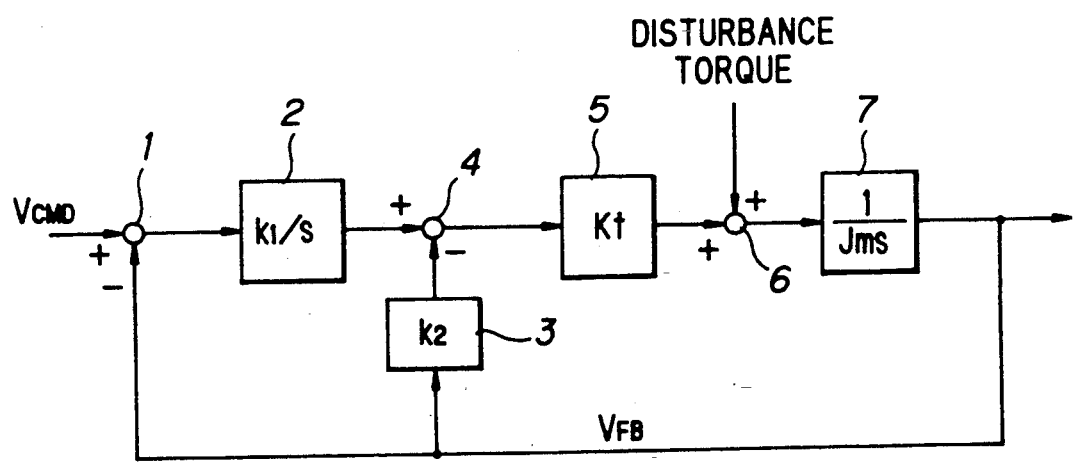
FIG. 7 is a block diagram showing a conventional velocity loop.

The high-pass filter 70 has a transfer function, using a Laplace transform with the Laplace operator (Laplacian) s, of $K_m \cdot s/(s+a)$ and is adapted to attenuate low-frequency components of the disturbance torque $\hat{x}_2$ estimated by the observer 50, multiply solely the high-frequency components by Km, and apply the result to the torque command correcting unit 15 of the velocity loop 10 as the corrective torque command $t_2$. The cut-off frequency of the high-pass filter 70 depends upon the constant a, and the frequency characteristic thereof is as indicated by F1 (the dashed line) in FIG. 6. The frequency characteristic of the observer 50 is as indicated by F2 (the one-dot chain line). Accordingly, the characteristic of the overall system is as indicated by F3 (the solid line).

The reason for thus attenuating or cutting the low-frequency components of the estimated disturbance torque $\hat{x}_2$ is that what causes the oscillation phenomenon when the magnitude of the ratio $t_2/t_1$ of the torque command $t_1$ to the corrective torque command $t_2$ becomes greater than 1 is the low-frequency component contained in the disturbance torque $x_2$. It should be noted that a torque correction cannot be applied to the low-frequency components of the disturbance torque owing to provision of the high-pass filter. However, in a case where the frequency components contained in the disturbance torque are sufficiently low in comparison with the band-pass frequency of the velocity loop, the effects of the low-frequency components of the disturbance torque can be diminished by the action of the velocity loop itself. Hence, no problems are encountered.

The overall operation of the apparatus of FIG. 1 will now be described.

The observer 50 estimates the disturbance torque in such a manner that the difference between the actual velocity of the motor and the estimated velocity will converge to zero, and applies the estimated disturbance torque $\hat{x}_2(t)$ to the high-pass filter 70.

The high-pass filter 70 attenuates the low-frequency components contained in the estimated disturbance torque $\hat{x}_2(t)$, multiplies solely the components higher than a predetermined frequency by $K_m$ and outputs the result as the corrective torque command $t_2$.

The torque correcting unit 15 outputs, as the true torque command u(t), a value obtained by subtracting the corrective torque command $t_2$ from the torque command $t_1$ computed based on the velocity command, thereby driving the motor.

Thereafter, the latest torque command u and the actual velocity $x_1$ are inputted to the observer 50 and the foregoing operation is repeated to suppress the fluctuation in velocity.

Thus, in accordance with the present invention as described above, low-frequency components are removed from estimated disturbance torque, as a result of which oscillation of the overall system can be prevented. Furthermore, even though the low-frequency components of disturbance torque are eliminated by the high-pass filter 70, a fluctuation in velocity due to the low-frequency components can be suppressed by the velocity loop itself and no problems are encountered.

Further, in accordance with the invention, since the correction coefficient $K_m$ of the disturbance torque estimated by the observer can be enlarged, it is possible to sufficiently suppress velocity fluctuation ascribable to high-frequency components, contained in the disturbance, that cannot be suppressed by the velocity loop.

I claim:

1. A servo-control apparatus for generating a torque command conforming to a difference between a commanded velocity and actual velocity and controlling velocity of a servomotor based on the torque command, comprising:

an observer for estimating actual velocity and disturbance torque and for reducing to zero an error between the actual velocity and an estimated velocity and an error between the disturbance torque and an estimated value of the disturbance torque;

a high-pass filter for applying high-pass processing to the disturbance torque estimated by said observer; and a torque-command correcting unit for correcting, based on the high-pass processing, the torque command applied to the servomotor.

2. A servo-control apparatus according to claim 1, wherein said high-pass filter has a transfer function characteristic of $k_m \cdot s/(s+a)$, where $K_m$ represents gain, s is a Laplacian and a represents a constant determining the cut-off frequency.

* * * * *